United States Patent
Yu et al.

(10) Patent No.: US 11,836,611 B2
(45) Date of Patent: Dec. 5, 2023

(54) METHOD FOR META-LEVEL CONTINUAL LEARNING

(71) Applicant: University of Massachusetts, Boston, MA (US)

(72) Inventors: Hong Yu, Shrewsbury, MA (US); Tsendsuren Munkhdalai, Worcester, MA (US)

(73) Assignee: UNIVERSITY OF MASSACHUSETTS, Boston, MA (US)

( * ) Notice: Subject to any disclaimer, the term of this patent is extended or adjusted under 35 U.S.C. 154(b) by 1508 days.

(21) Appl. No.: 16/044,108

(22) Filed: Jul. 24, 2018

(65) Prior Publication Data

US 2019/0034798 A1   Jan. 31, 2019

Related U.S. Application Data

(60) Provisional application No. 62/549,509, filed on Aug. 24, 2017, provisional application No. 62/536,945, filed on Jul. 25, 2017.

(51) Int. Cl.

| | |
|---|---|
| *G06N 3/08* | (2023.01) |
| *H04L 67/10* | (2022.01) |
| *G06N 3/04* | (2023.01) |
| *G06N 3/063* | (2023.01) |
| *G06N 3/084* | (2023.01) |
| *G06N 3/045* | (2023.01) |
| *G06N 3/048* | (2023.01) |
| *G06N 3/044* | (2023.01) |
| *G06N 3/047* | (2023.01) |

(52) U.S. Cl.
CPC ............. *G06N 3/08* (2013.01); *G06N 3/04* (2013.01); *G06N 3/045* (2023.01); *G06N 3/048* (2023.01); *G06N 3/063* (2013.01); *G06N 3/084* (2013.01); *H04L 67/10* (2013.01); *G06N 3/044* (2023.01); *G06N 3/047* (2023.01)

(58) Field of Classification Search
CPC ...................................................... G06N 3/08
See application file for complete search history.

(56) References Cited

U.S. PATENT DOCUMENTS

| | | | |
|---|---|---|---|
| 6,842,751 B1* | 1/2005 | Vilalta | ........................... 706/14 |
| 2004/0024745 A1* | 2/2004 | Jeng | ...................... G06F 16/951 |

(Continued)

OTHER PUBLICATIONS

Bilalli et al., "Automated Data Pre-processing via Meta-learning", 2016 (Year: 2016).*

(Continued)

*Primary Examiner* — Selene A. Haedi
(74) *Attorney, Agent, or Firm* — Hamilton, Brook, Smith & Reynolds, P.C.

(57) ABSTRACT

Classification of an input task data set by meta level continual learning includes analyzing first and second training data sets in a task space to generate first and second meta weights and a slow weight value, and comparing an input task data set to the slow weight to generate a fast weight. The first and second meta weights are parameterized with the fast weight value to update the slow weight value, whereby a value is associated with the input task data set, thereby classifying the input task data set by meta level continual learning.

19 Claims, 4 Drawing Sheets

(56) References Cited

U.S. PATENT DOCUMENTS

| | | | | |
|---|---|---|---|---|
| 2007/0203863 | A1* | 8/2007 | Gupta | G06N 3/0454 706/20 |
| 2009/0083332 | A1* | 3/2009 | Datta | G06K 9/6263 |
| 2014/0279741 | A1* | 9/2014 | Sow | G06N 20/00 706/12 |

OTHER PUBLICATIONS

Vinyals et al., "Matching Networks for One Shot Learning", Jun. 2016 (Year: 2016).*

Li et. al., "Meta-SGD: Learning to Learn Quickly for Few Shot Learning", Jul. 2017 (Year: 2017).*

Duan et al., "One-Shot Imitation Learning", Mar. 2017 (Year: 2017).*

Hornik et al., "Open-source machine learning: R meets Weka", 2009 (Year: 2009).*

Andrychowicz, M., et al., "Learning to learn by gradient descent by gradient descent", 30th Conference on Neural Information Processing Systems (NIPS 2016), In Advances in Neural Information Processing Systems, pp. 3981-3989, 2016.

Ba, J., et al., "Using fast weights to attend to the recent past", In Advances in Neural Information Processing Systems, pp. 4331-4339, 2016.

Bengio, Y., et al., "Learning a synaptic learning rule" Université de Montréal, Département d'informatique et de recherche opérationnelle, 1990.

Chopra, S.et al., "Learning a similarity metric discriminatively, with application to face verification", In Computer Vision and Pattern Recognition, 2005. CVPR 2005. IEEE Computer Society Conference on, vol. 1, pp. 539-546. IEEE, 2005.

Ha, D., et al. "HyperNetworks", In ICLR 2017, 2017.

De Brabandere, B. et al., "Dynamic filter networks", In Neural Information Processing Systems (NIPS), 2016.

Gomez, F., et al. "Evolving modular fast-weight networks for control.", In International Conference on Artificial Neural Networks, pp. 383-389.Springer, 2005.

Goodfellow, I., etal., "An empirical investigation of catastrophic forgetting in gradient-based neural networks", In ICLR 2014, 2014.

Graves, AI., et al. "Neural turing machines", arXiv preprint arXiv:1410. 5401, 2014.

Greengard, P., "The neurobiology of slow synaptic transmission", Science, 294(5544): 1024-1030, 2001.

Harlow, Harry F. The formation of learning sets. Psychological review, 56(1):51, 1949.

Hinton, G., et al., "Using fast weights to deblur old memories", In Proceedings of the ninth annual conference of the Cognitive Science Society, pp. 177-186, 1987.

Hochreiter,et al., Learning to learn using gradient descent:, In International Conference on Artificial Neural Networks, pp. 87-94. Springer, 2001.

Kaiser, L., et al., "Learning to remember rare events", In ICLR 2017, 2017.

Kirkpatrick, J., et al. "Overcoming catastrophic forgetting in neural networks.", arXiv preprintarXiv:1612.00796, 2016.

Koch, G., "Siamese neural networks for one-shot image recognition", PhD thesis, University of Toronto, 2015.

Lake, B., et al., "One-shot learning by inverting a compositional causal process", In Advances in neural information processing systems, pp. 2526-2534, 2013.

Lake, B., et al., "Human-level concept learning through probabilistic program induction", Science, 350(6266):1332-1338, 2015.

Li, K., "Learning to optimize",. In ICLR 2017, 2017.

Maclaurin, D., "Gradient-based hyperparameter optimization through reversible learning", In International Conference on Machine Learning, pp. 2113-2122, 2015.

Mitchell, T., et al. "Explanation based neural network learning for robot control", Advances in neural information processing systems, pp. 287-287, 1993.

Munkhdalai, T., "Meta Networks," Proceedings of the Int. Conf. on Machine Learning, Sydney, Australia 2017, 11 pages.

Munkhdalai, Tsendsuren, et al., "Rapid Adaptation With Conditionally Shifted Neurons," Proceedings of the 35th Int. Conf. on Machine Learning, Stockholm, Sweden 2018, 12 pages.

Munkhdalai, Tsendsuren and Yu, Hong. Neural semantic encoders. In Proceedings of the 15th Conference of the European Chapter of the Association for Computational Linguistics: vol. 1, Long Papers, pp. 397-407, Valencia, Spain, Apr. 2017. Association for Computational Linguistics. URL http://www.aclweb.org/anthology/E17-1038.

Ravi, Sachin and Larochell, Hugo. Optimization as a model for few-shot learning. In ICLR 2017, 2017.

Santoro, A., et al., "Meta-learning with memory-augmented neural networks", In Proceedings of The 33rd International Conference on Machine Learning, pp. 1842-1850, 2016.

Schmidhuber, J. "Reducing the Ratio Between Learning Complexity and Number of Time Varying Variables in Fully Recurrent Nets", pp. 460-463. Springer London, London, 1993. ISBN 978-1-4471-2063-6. doi: 10.1007/978-1-4471-2063-6 110. URL http://dx.doi.org/10.1007/978-1-4471-2063-6_110.

Schmidhuber, J., "A neural network that embeds its own meta-levels", In IEEE International Conference on Neural Networks, pp. 407-412 vol. 1, 1993. doi: 10.1109/ICNN.1993.298591.

Schmidhuber, Jürgen. "Evolutionary principles in self-referential learning", PhD thesis, Technical University of Munich, 1987.

Schmidhuber, Jürgen. "Learning to control fast-weight memories: An alternative to dynamic recurrent networks.", Neural Computation, 4(1):131-139, 1992.

Srivastava, R., et al., "Compete to compute", In Advances in neural information processing systems, pp. 2310-2318, 2013.

Sukhbaatar, S., et al. "End-to-end memory networks", In Advances in neural information processing systems, pp. 2440-2448, 2015.

Vilalta, R., "A perspective view and survey of meta-learning", Artificial Intelligence Review, 18(2):77-95, 2002.

Weston, J., et al., "Memory networks", In in Proceedings of the International Conference on Representation Learning (ICLR 2015), San Diego, California, May 2015.

Younger, A Steven, Conwell, Peter R, and Cotter, Neil E. Fixed-weight on-line learning. IEEE Transactions on Neural Networks, 10(2):272-283, 1999.

Edwards, Harrison and Storkey, Amos. Towards a neural statistician. In ICLR 2017, 2017.

* cited by examiner

METHOD FOR META-LEVEL CONTINUAL LEARNING

RELATED APPLICATIONS

This application priority to and claims the benefit of U.S. Provisional Application No. 62/536,945, filed on Jul. 25, 2017 and U.S. Provisional Application No. 62/549,509, filed on Aug. 24, 2017. The entire teachings of the above applications are incorporated herein by reference.

GOVERNMENT SUPPORT FEDERALLY SPONSORED RESEARCH OR DEVELOPMENT

This invention was made with Government support under Grant No. HL125089 awarded by the National Institutes of Health and by the Grant No. 1I01HX001457-01 awarded by the Health Services Research & Development of the US Department of Veterans Affairs Investigator Initiated Research. The Government has certain rights in the invention.

BACKGROUND

Deep neural networks have shown great success in several application domains when a large amount of labeled data is available for training. However, the availability of such large training data has generally been a prerequisite in a majority of learning tasks. Furthermore, the standard deep neural networks lack the ability to continuous learning or incrementally learning new concepts on the fly, without forgetting or corrupting previously learned patterns. In contrast, humans can rapidly learn and generalize from a few examples of the same concept. Humans are also very good at incremental (i.e. continuous) learning. These abilities have been mostly explained by the meta learning (i.e. learning to learn) process in the brain (Harlow, 1949).

Previous work on meta learning has formulated the problem as two-level learning, a slow learning of a meta-level base-level model acting within each task (Mitchell et al., 1993; Vilalta & Drissi, 2002). The goal of a meta-level learner is to acquire generic knowledge of different tasks. The knowledge can then be transferred to the base-level learner to provide generalization in the context of a single task. The base and meta-level models can be framed in a single learner (Schmidhuber, 1987) or in separate learners (Bengio et al., 1990; Hochreiter et al., 2001).

A key challenge in this setting is that the classes or concepts vary across the tasks. Due to this, one-shot learning problems have been widely addressed by generative models and metric learning methods. One notable success is reported by a probabilistic programming approach (Lake et al., 2015). They used specific knowledge of how pen strokes are composed to produce characters of different alphabets. Koch (2015) applied Siamese Networks to perform one-shot classification. Recently, Vinyals et al. (2016) unified the training and testing of a one-shot learner under the same procedure and developed an end-to-end differentiable nearest neighbor method for one-shot learning. Santoro et al. (2016) proposed a memory-based approach and trained Neural Turing Machines (Graves et al., 2014) for one-shot learning, although the meta-learner and the oneshot learner in this work are not separable explicitly. The training procedure used by Santoro et al. (2016) adapted the work of Hochreiter et al. (2001) in which they use LSTMs as the meta-level model. More recently an LSTM-based one-shot optimizer was proposed (Ravi & Larochell, 2017). By taking in the loss, the gradient and the parameters of the base learner, the meta optimizer was trained to update the parameters for one-shot classification.

A related line of work focuses on building meta optimizers (Hochreiter et al., 2001; Maclaurin et al., 2015; Andrychowicz et al., 2016; Li & Malik, 2017). These efforts have mainly focused on tasks with large datasets. Fast weights and utilizing one neural network to generate parameters for another neural network have previously been studied separately. Hinton & Plaut (1987) suggested the usage of fast weights for rapid learning. Ba et al. (2016) recently used fast weights to replace soft attention mechanism. Fast weights have also been used to implement recurrent nets (Schmidhuber, 1992; 1993a) and self-referential networks (Schmidhuber, 1987; 1993b). These usages of fast weights are motivated by the fact that synapses have dynamics at many different time-scales (Greengard, 2001).

Gomez & Schmidhuber (2005) employed recurrent nets to generate fast weights for a single-layer network controller. De Brabandere et al. (2016) used one network to generate slow filter weights for a convolutional neural net. More recently David Ha & Le (2017) generated slow weights for recurrent nets.

SUMMARY OF THE INVENTION

The invention generally is directed to a method of classifying an input task data set by meta level continual learning.

In one embodiment, the method includes analyzing a first training data set to thereby generate a meta information value in a task space. The first meta-information value is assigned to the first training data set to generate a first meta weight value in a meta space. A second training data set that is distinct from the first training data set is analyzed to thereby generate a second meta information value in the input in the task space. The second meta information value is assigned to the second training data set to generate a second meta-weight value in the meta space. The first meta-weight value is compared to the second meta-weight value to thereby generate a slow weight value. The slow weight value is stored in a memory that is accessible by the test space and the meta space. An input task data set is compared to the slow weight value to thereby generate a third meta-information value in the task space. The third meta information value is transmitted from the task space to the meta space. The third meta information value is compared to the slow weight value to thereby generate a fast weight value in the meta space. The first and the second meta-weight values are parameterized with the fast weight value to update the slow weight value, whereby a value is associated with the input test data set, thereby classifying the input test data set by meta level continual learning.

In one embodiment, the method of the invention optimizes a neural network with a large number of parameters to generalize, but with limited examples of a new concept. In a specific embodiment of the invention, fast weights are generated at two time-scales by operating in meta space. In yet another embodiment, augmentation can be employed to integrate the fast weights with the slow weights. In one embodiment, the method employs an external memory, thereby constituting a memory augmented neural network (MANN).

In another aspect, the invention is directed to a method of facilitating one-shot learning in a neural network. The method may be implemented by a processor and an instruction memory with computer code instructions stored thereon. The instruction memory may be operatively coupled to the processor such that, when executed by the processor, the computer code instructions cause the system to implement the method. The method may comprise, for each of a set of T support examples from a set of N support examples (N and T being integers), generating a representation loss associated using a representation learning function parameterized by a first slow weight, and generating a representation loss gradient based on the representation loss and a loss gradient associated with the first slow weight. The method may further comprise generating a first fast weight by evaluating a first generating function parameterized by a first meta weight and the loss gradients associated with the first slow weights generated for the T support examples. For each of the set of N support examples, the method may further comprise (i) generating a task loss using a base learning function parameterized by a second slow weight, (ii) generating a task loss gradient based on the task loss and a loss gradient associated with the second slow weight, (iii) mapping the task loss gradient, through a second generating function parameterized by a second meta weight, to a second fast weight, and storing the second fast weight in a weight memory, and (iv) generating a first task-dependent input representation using the representation learning function parameterized by an integration of the first slow weight and the first fast weight, and indexing the weight memory with the task-dependent input representation. The method may further comprise, for each of a set of L training examples (L being an integer), generating a second task-dependent input representation using the representation learning function parameterized by an integration of the first slow weight and the first fast weight, reading the weight memory with soft attention, using the second task-dependent input representation, to generate a third fast weight, and generating a training loss using a base learning function parameterized by an integration of the second slow weight and the second fast weight, added to a previous training loss. The method may further comprise updating the first slow weight, the second slow weight, the first meta weight and the second meta weight using the training loss and a loss gradient associated with the first slow weight, the second slow weight, the first meta weight and the second meta weight.

In another aspect, the invention is directed to a system for facilitating one-shot learning in neural network. The system may comprise a meta learner module, and a base learner module operatively coupled to the meta learner module. The meta learner module and base learner module may be configured to cooperatively acquire meta information from a support set of examples, generate one or more fast weights, and optimize one or more slow weights used by the base learner module, based on the one or more fast weights and a training set of examples. The system may further comprise a memory device operatively coupled to the meta learner module and the base learner module. The meta learner module and base learner module may be configured to cooperatively store the one or more slow weights and the one or more fast weights in the memory device.

This invention has many advantages. For example, the method of the invention, generally referred to herein as "MetaNet" (for "Meta Networks"), supports meta-level continual learning by allowing neural networks to learn and to generalize a new task or concept from a single example on the fly. Also, the method of the invention enables rapid learning and generalization, namely one-shot learning where a learner is introduced to a sequence of tasks, and where each task entails multi-class classification with a single or few labeled example per class. The invention can advance artificial intelligence (AI) applications that have only a few labelled examples. It can also assist in building complex knowledge and inference (intelligence). Some additional practical applications include face and voice recognition, self-driving cars, and natural language comprehension, made as necessary to answer questions.

DETAILED DESCRIPTION OF THE INVENTION

A description of example embodiments follows.

The invention generally is directed to a method of classifying an input task data set by meta level continual learning.

In one embodiment, the method includes analyzing a first training data set to thereby generate a meta information value in a task space. The first meta-information value is assigned to the first training data set to generate a first meta weight value in a meta space. A second training data set that is distinct from the first training data sets is analyzed to thereby generate a second meta information value in the input in the task space. The second meta information value is assigned to the second training data set to generate a second meta-weight value in the meta space. The first meta-weight value is compared to the second meta-weight value to thereby generate a slow weight value. The slow weight value is stored in a memory that is accessible by the test space and the meta space. An input task and data set is compared to the slow weight value to thereby generate a third meta-information value in the task space. The third meta information value is transmitted from the task space to the meta space. The third meta information value is compared to the slow weight value to thereby generate a fast weight value in the meta space. The first and the second meta-weight values are parameterized with the fast weight value to update the slow weight value, whereby a value is associated with the input test data set, thereby classifying the input task data set by meta level continual learning.

In one embodiment, the method of the invention optimizes a neural network with a large number of parameters to generalize, but with limited examples of a new concept. In a specific embodiment of the invention, fast weights are generated at two time-scales by operating in meta space. In yet another embodiment, augmentation can be employed to integrate the fast weights with the slow weights. In one embodiment, the method employs an external memory, thereby constituting a memory augmented neural network (MANN).

Figure 1:
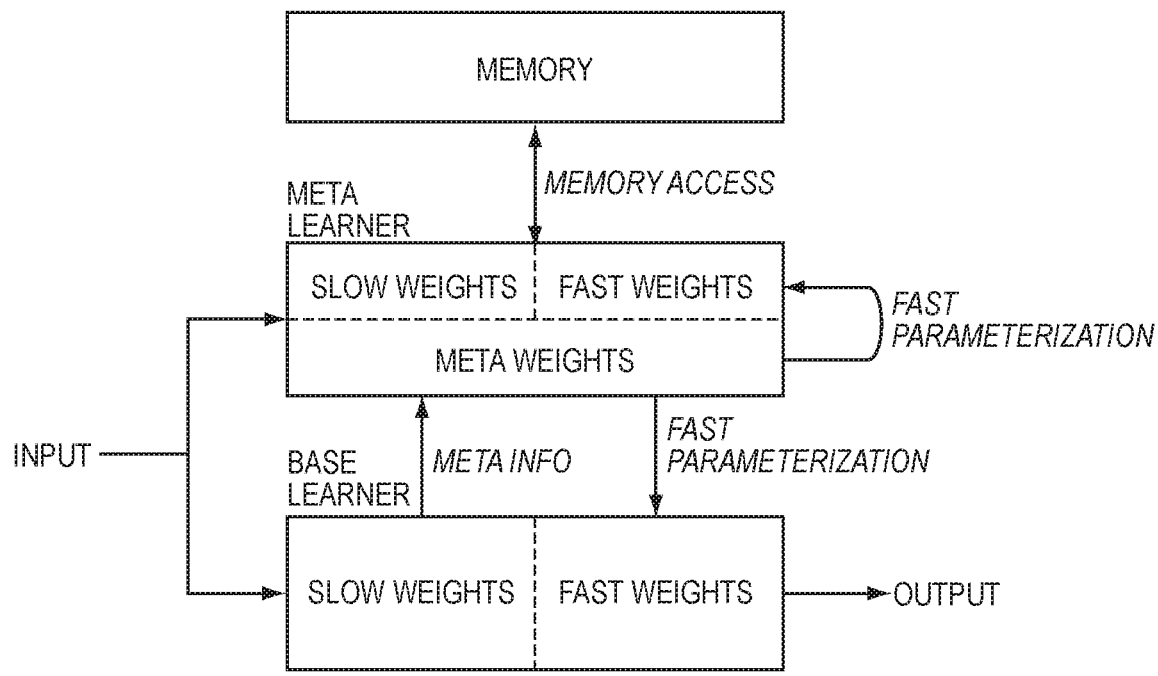
FIG. 1 is a schematic representation of an overall architecture of one embodiment of a method of the invention.

The overall architecture of the method of in the invention ("MetaNet") is shown in FIG. 1. In one embodiment, the method of the invention includes two main learning components, a base learner and a meta learner, and, optionally, is equipped with an external memory. Learning occurs at two levels in separate spaces (i.e. meta space and task space). The base learner performs in the input task space whereas the meta learner operates in a task-agnostic meta space. By operating in the abstract meta space, the meta learner supports continual learning and performs meta knowledge acquisition across different tasks. Towards this end, the base learner first analyzes the input task. The base learner then provides the meta learner with a feedback in the form of higher order meta information to explain its own status in the current task space. Based on the meta information, the meta learner parameterizes both itself and the base learner so that the MetaNet model can recognize the new concepts of the input task. Specifically, the training weights of MetaNet evolve at different time-scales: standard slow weights are updated through a learning algorithm (e.g., REINFORCE), task-level fast weights are updated within the scope of each task, and example-level fast weights are updated for a specific input example. Finally, MetaNet equipped with external memory enables rapid learning and generalization.

Under the MetaNet framework of the invention, the types of the meta information that can be obtained from the learners is defined. While other representations of meta information are also applicable, loss gradients are employed as meta information. The method of the invention has two types of loss functions with distinct objectives: a representation (i.e. embedding) loss defined for the good representation learner criteria and a main (task) loss used for the input task objective.

The method of the invention learns to fast-parameterize underlying neural networks for rapid generalizations by processing a higher order meta information, resulting in a flexible AI model that can adapt to a sequence of tasks with possibly distinct input and output distributions. In one embodiment of the invention, the method employs two main learning modules (FIG. 1). Meta learner is responsible for fast weight generation by operating across tasks while the base learner performs within each task by capturing the task objective. Fast weights are integrated into both base learner and meta learner to shift the inductive bias of the learners. In one embodiment, the method includes a layer augmentation method to integrate the slow weights and the task or example specific fast weights in a neural net.

In a specific embodiment, the method of the invention includes training by incorporating a suitable task formulation procedure, such as is described in Vinyals, et al. (2016), the relevant teachings of which are incorporated herein by reference in their entirety. For example, a sequences of tasks is formed, where each task includes a support set $\{x'_i, y'_i\}_{i=1}^N$ and a training set $\{x_i, y_i\}_{i=1}^L$. Class labels are consistent for both support and training sets of the same task, but vary across distinct tasks. Training includes three main procedures: acquisition of meta information, generation of fast weights and optimization of slow weights, executed collectively by the base and the meta learner. Training is generally described as Algorithm 1, shown below:

---

Algorithm 1 MetaNet for one-shot supervised learning

---

Require: Support set $\{x'_i, y'_i\}_{i=1}^N$ and Training set $\{x_i, y_i\}_{i=1}^L$
Require: Base learner b, Dynamic representation learning function u, Fast weight generation functions m and d, and Slow weights $\theta = \{W, Q, Z, G\}$
Require: Layer augmentation scheme
1:    Sample T examples from support set
2:    for i = 1, T do
3:      $\mathcal{L}_i \leftarrow \text{loss}_{emb}(u(Q, x'_i), y'_i)$
4:      $\nabla_i \leftarrow \nabla_Q \mathcal{L}_i$
5:    end for
6:    $Q^* = d(G, \{\nabla\}_{i=1}^T)$
7:    for i = 1, N do
8:      $\mathcal{L}_i \leftarrow \text{loss}_{task}(b(W, x'_i), y'_i)$
9:      $\nabla_i \leftarrow \nabla_W \mathcal{L}_i$
10:     $W^*_i \leftarrow m(Z, \nabla_i)$
11:     Store $W^*_i$ in $i^{th}$ position of memory M
12:     $r'_i = u(Q, Q^*, x'_i)$
13:     Store $r'_i$ in $i^{th}$ position of index memory R
14:    end for
15:    $\mathcal{L}_{train} = 0$
16:    for i = 1, L do
17:     $r_i = u(Q, Q^*, x_i)$
18:     $a_i = \text{attention}(R, r_i)$
19:     $W^*_i = \text{softmax}(a_i)^\top M$
20:     $\mathcal{L}_{train} \leftarrow \mathcal{L}_{train} + \text{loss}_{task}(b(W, W^*_i, x_i), y_i)$
       {Alternatively the base learner can take as input $r_i$ instead of $x_i$}
21:    end for
22:    Update $\theta$ using $\nabla_\theta \mathcal{L}_{train}$

---

To test the method, another sequence of tasks is sampled from a test dataset with unseen classes. Then the method is deployed to classify test examples based on its support set. Class labels for the support set during both training and testing are assumed. In one learning setup, the support set need contain only a single example per class.

In one embodiment, the meta learner employed by the method of the invention includes a dynamic representation learning function u and fast weight generation functions m and d. The function u has a representation learning objective and constructs embeddings of inputs in each task space by using task-level fast weights. The weight generation functions m and d are responsible for processing the meta information and generating the example and task level fast weights.

More specifically, the function m learns the mapping from the loss gradient $\{\nabla_i\}_{i=1}^N$, derived from the based learner b, to fast weights $\{W^*_i\}_{i=1}^N$:

$$W^*_i = m(Z, \nabla_i) \quad (1)$$

where m is a neural network with parameter Z. The fast weights are then stored in a memory $M=\{W^*_i\}_{i=1}^N$. The memory M is indexed with task dependent embeddings $R=\{r'_i\}_{i=1}^N$ of the support examples $\{x'_i\}_{i=1}^N$, obtained by the dynamic representation learning function u.

The representation learning function u is a neural net parameterized by slow weights Q and task-level fast weights $Q^*$. It uses the representation loss $\text{loss}_{emb}$ to capture a representation learning objective and to obtain the gradients as meta information. We generate the fast weights $Q^*$ on a per task basis as follows:

$$\mathcal{L}_i = \text{loss}_{emb}(u(Q, x'_i), y'_i) \quad (2)$$

$$\nabla_i \nabla_Q \mathcal{L}_i \quad (3)$$

$$Q^* = d(G, \{\nabla\}_{i=1}^T) \quad (4)$$

where d denotes a neural net parameterized by G, that accepts variable sized input. First, T examples (T≤N) $\{x'_i, y'_i\}_{i=1}^{T}$ are sampled from the support set to obtain the loss gradient as meta information. Then d observes the gradient corresponding to each sampled example and summarizes into the task specific parameters. LSTM is employed for d although the order of inputs to d does not matter. Alternatively, a summation or average of the gradients and a MLP can be used.

Once the fast weights are generated, the task dependent input representations $\{r'_i\}_{i=1}^{N}$ are computed as:

$$r'_i = u(Q, Q^*, \chi'_i) \tag{5}$$

where the parameters Q and Q* are integrated using the layer augmentation method described infra.

The loss, $loss_{emb}$ does not need to be the same as the main task loss $loss_{task}$. However, it can capture a representation learning objective. Cross-entropy loss is employed when the support set has only a single example per class. When there is more than one example per class available, contrastive loss (e.g., Chopra et al., 2005) is a natural choice for $loss_{emb}$ since both positive and negative samples can be formed. In this case, T number of pairs is randomly drawn to observe the gradients, and the loss is $$\mathcal{L}_i = loss_{emb}(u(Q, \chi'_{1,i}), u(Q, \chi'_{2,i}), l_i) \tag{6}$$

where $l_i$ auxiliary label:

$$l_i = \begin{cases} 1, & \text{if } y'_{1,i} = y'_{2,i} \\ 0, & \text{otherwise} \end{cases} \tag{7}$$

Once the parameters are stored in the memory M and the memory index R is constructed, the meta learner parameterizes the base learner with the fast weights $W^*_i$. First it embeds the input $x_i$ in the task space by using the dynamic representation learning network (i.e. Equation 5) and then reads the memory with soft attention:

$$a_i = \text{attention}(R, r_i) \tag{8}$$

$$W^*_i = \text{norm}(a_i)^\tau M \tag{9}$$

where attention calculates similarity between the memory index and the input embedding. Cosine similarity is employed as attention, and norm is a normalization function, for which softmax is used.

A base learner, denoted as b, is a function or a neural net that estimates the main task objective via a task loss $loss_{task}$. However, unlike standard neural nets, b is parameterized by slow weights W and example-level fast weights W*. The slow weights are updated via a learning algorithm during training whereas the fast weights are generated by the meta learner for every input.

The base learner uses a representation of meta information obtained by using a support set, to provide the meta learner with feedbacks about the new input task. The meta information is derived from the base learner in form of the loss gradient information:

$$\mathcal{L}_i = loss_{task}(b(W, \chi'_i), y'_i) \tag{10}$$

$$\nabla_i = \nabla_W \mathcal{L}_i \tag{11}$$

Here $L_i$ is the loss for support examples $\{x'_i, y'_i\}_{i=1}^{N}$. N is the number of support examples in the task set (typically a single instance per class in the one-shot learning setup). $\nabla_i$ is the loss gradient with respect to parameters W and is our meta information. The loss function $loss_{task}$ is generic and can take any form, such as a cumulative reward in reinforcement learning. For one-shot classification setup, cross-entropy loss is employed. The meta learner takes in the gradient information $\nabla_i$ and generates the fast parameters W* as in Equation 1.

Assuming that the fast weights $W^*_i$ for input $x_i$ are defined, the base learner performs the one-shot classification as:

$$P(\hat{y}_i | x_i, W, W^*_i) = b(W, W^*_i; \chi_i) \tag{12}$$

where $\hat{y}_i$ is predicted output and $\{x_i\}_{i=1}^{L}$ is an input drawn from the training set for the current task. Alternatively, the base learner can take as input the task specific representations $\{x_i\}_{i=1}^{L}$ produced by the dynamic representation learning network, effectively reducing the number of parameters and leveraging shared representations. In this case, the base learner is forced to operate in the dynamic task space constructed by u instead of building new representations from the raw inputs $\{x_i\}_{i=1}^{L}$.

During training, given output labels $\{y_i\}_{i=1}^{L}$, the cross-entropy loss for one-shot SL is minimized. The training parameters of θ consists of the slow weights W and Q and the meta weights Z and G (i.e. θ={W Q, Z, G}) and jointly updated via a training algorithm such as backpropagation to minimize the task loss $loss_{task}$ (Equation 12).

In a similar way, as defined in Equations 2-4, the base learner can also be parameterized with task-level fast weights. Ablation on different variations of the method of the invention is described infra.

Figure 2:
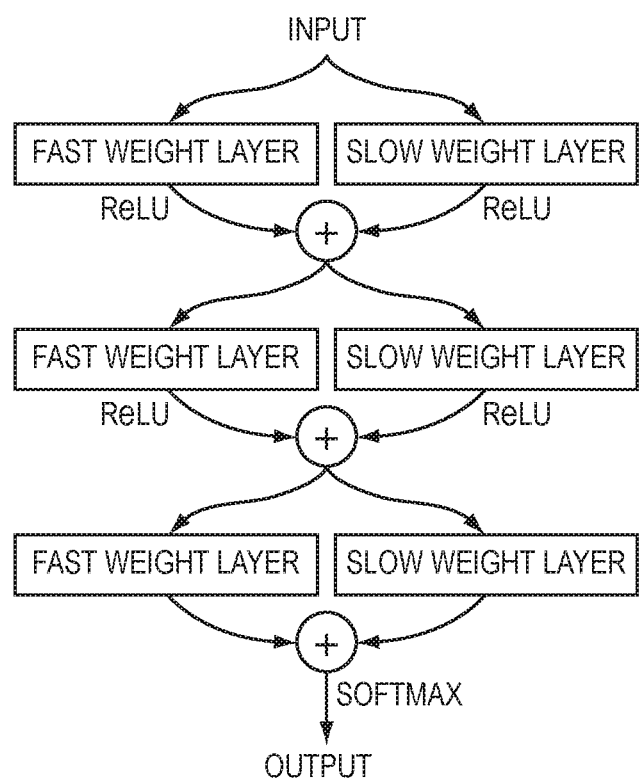
FIG. 2 is a schematic representation of one embodiment of layer augmented multilayer perceptron of a method of the invention.

In one embodiment, the method of the invention employs layer augmentation, wherein a slow weight layer in the base learner is extended with its corresponding fast weights for rapid generalization. An example of a layer augmentation approach applied to an MLP is shown in FIG. 2. The input of an augmented layer is first transformed by both slow and fast weights and then passed through a non-linearity (i.e. ReLU) resulting in two separate activation vectors. Finally, the activation vectors are aggregated by an element-wise vector addition. For the last softmax layer, two transformed inputs are aggregated, and then classification output is normalized.

Intuitively, the fast and slow weights in the layer augmented neural net can be seen as feature detectors operating in two distinct numeric domains. The application of the non-linearity maps them into the same domain, which is [0, ∞) in the case of ReLU so that the activations can be aggregated and processed further. The aggregation function here is element-wise sum.

Although it is possible to define the base learner with only fast weights in one embodiment, the integration of both slow and fast weights with the layer augmentation approach is employed in convergence of the method of the invention. When the method relied on a base learner with only fast weights, the best performance of this model was reported to be equal to that of a constant classifier that assigns the same label to every input.

The following is a demonstration of embodiments of the invention, which are not intended to be limiting in any way.

EXEMPLIFICATION

One-shot classifications were conducted on three datasets: Omniglot, Mini-ImageNet and MNIST. The Omniglot dataset consisted of images across 1623 classes with only 20 images per class, from 50 different alphabets (Lake et al., 2015). It also came with a standard split of 30 training and 20 evaluation alphabets. Following Santoro et al., 2016, the training set was augmented through rotations of 90, 180 and 270 degrees. The images were resized to 28×28 pixels for computational efficiency. Using Mini-ImageNet data, the same class subset provided by Ravi & Larochell (2017) was employed. MNIST images were used as out-of-domain data.

Training Details

To train and test the method of the invention on one-shot learning, the training procedure introduced by Vinyals et al. (2016) was adapted. First, the data was split into training and test sets consisting of two disjoint classes. A series of tasks (trials) was then formulated from the training set. Each task had a support set of N classes with one image per, resulting in an N-way one-shot classification problem. In addition to the support set, L number of labeled examples was included in each task set to update the parameters θ during training. For testing, the same procedure to form a set of test tasks from the disjoint classes was followed. However, now the method of the invention assigned class labels to L examples based only on the labeled support set of each test task.

For the one-shot benchmarks on the Omniglot dataset, a CNN with 64 filters as the base learner b was used. This CNN has 5 convolutional layers, each of which is a 3×3 convolution with 64 filters, followed by a ReLU non-linearity, a 2×2 max-pooling layer, a fully connected (FC) layer, and a softmax layer. Another CNN with the same architecture was used to define the dynamic representation learning function u, from which we take the output of the FC layer as the task dependent representation r was taken. A similar CNNs architecture with 32 filters for the experiment on Mini-ImageNet was trained. For computational efficiency, as well as to demonstrate the flexibility of MetaNet, the last three layers of these CNN models were augmented by fast weights. For the networks d and m, a single-layer LSTM with 20 hidden units and a three-layer MLP with 20 hidden units and ReLU non-linearity was used. As in Andrychowicz et al. (2016), the parameters G and Z of d and m were shared across the coordinates of the gradients ∇ and the gradients were normalized using the same preprocessing rule (with p=7). The parameters θ for the method of the invention were optimized with ADAM. The initial learning rate was set to $10^{-3}$. The model parameters θ were randomly initialized from the uniform distribution over [−0.1, 0.1].

One Shot Learning Test

Omniglot Previous Split

Omniglot classes were split into 1200 and 423 classes for training and testing. 5, 10, 15 and 20-way oneshot classification were performed. Three variations of the method of the invention as an ablation experiment were studied to show how fast parameterization affects the network dynamics.

In Table 1, the performance of the method of the invention was compared with published models (as baselines).

TABLE 1

One-shot accuracy on Omniglot previous split

| Model | 5-way | 10-way | 15-way | 20-way |
|---|---|---|---|---|
| Pixel kNN (Kaiser et al., 2017) | 41.7 | — | — | 26.7 |
| Siamese Net (Koch, 2015) | 97.3 | — | — | 88.1 |
| MANN (Santoro et al., 2016) | 82.8 | — | — | — |
| Matching Nets (Vinyals et al., 2016) | 98.1 | — | — | 93.8 |
| Neural Statistician (Edwards & Storkey, 2017) | 98.1 | — | — | 93.2 |
| Siamese Net with Memory (Kaiser et al., 2017) | 98.4 | — | — | 95.0 |
| MetaNet− | 98.4 | 98.32 | 96.68 | 96.13 |
| MetaNet | 98.95 | 98.67 | 97.11 | 97.0 |
| MetaNet+ | 98.45 | 97.05 | 96.48 | 95.08 |

The first group of methods are the previously published models. The next group variations of the method of the invention, "MetaNet" of which the main architecture of which described supra. "MetaNet−" is a variant of the method of the invention without task-level fast weights Q* in the embedding function u, whereas "MetaNet+" of the method of the invention has additional task-level weights for the base learner in addition to W*. The method of the invention, namely "MetaNet," "MetaNet−," and MetaNet+," improved the previous best results by 0.5% to 2% accuracy. As the number of classes increased (from 5-way to 20-way classification), overall the performance of the oneshot learners decreased. MetaNet's performance drop was relatively small (around 2%) while the drop for the other models ranged from 3% to 15%. As a result, the method of the invention showed an absolute improvement of 2% on 20-way one-shot task.

Comparing different MetaNet variations, the additional task-level weights in the base learner (MetaNet+) did not seem to help and in fact had a negative effect on performance. MetaNet− however performed surprisingly well but still fell behind the MetaNet model as it lacked the dynamic representation learning function. This performance gap increased when they were tested in out-of-the-domain setting, described infra.

Mini-Imagenet

The training, dev and testing sets of 64, 16, and 20 ImageNet classes (with 600 examples per class) were provided by Ravi & Larochell (2017). By following Ravi & Larochell (2017), 15 examples per class for evaluation were sampled. By using the dev set, we set an evaluation checkpoint was set where only if the model performance exceeded the previous best result on random 400 trials produced from the dev set. The model was applied to another 400 trials randomly produced from the testing set and the average accuracy was reported.

Table 2 shows the results of the 5-way one-shot evaluation. MetaNet improved the previous result by up to 6% accuracy and obtained the best result.

TABLE 2

One-shot accuracy on Mini-ImageNet test set

| Model | 5-way |
|---|---|
| Fine-tuning (Ravi & Larochell, 2017) | 28.86 ± 0.54 |
| kNN (Ravi & Larochell, 2017) | 41.08 ± 0.70 |
| Matching Nets (Vinyals et al., 2016) | 43.56 ± 0.84 |
| MetaLearner LSTM (Ravi & Larochell, 2017) | 43.44 ± 0.77 |
| MetaNet | 49.21 ± 0.96 |

Omniglot Standard Split

Omniglot data came with a standard split of 30 training alphabets with 964 classes and 20 evaluation alphabets with 659 classes. Only the standard MetaNet model in this setup was trained and tested. To best match the evaluation protocol of Lake et al. (2015), we formed 400 tasks (trials) from the evaluation classes to test the model.

In Table 3, the MetaNet results were listed along with the previous models and human performance.

TABLE 3

One-shot accuracy on Omniglot standard split

| Model | 5-way | 10-way | 15-way | 20-way |
|---|---|---|---|---|
| Human performance (Lake et al., 2015) | — | — | — | 95.5 |

TABLE 3-continued

One-shot accuracy on Omniglot standard split

| Model | 5-way | 10-way | 15-way | 20-way |
|---|---|---|---|---|
| Pixel kNN (Lake et al., 2013) | — | — | — | 21.7 |
| Affine model (Lake et al., 2013) | — | — | — | 81.8 |
| Deep Boltzmann Machines (Lake et al., 2013) | — | — | — | 62.0 |
| Hierarchial Bayesian Program Learning (Lake et al., 2015) | — | — | — | 96.7 |
| Siamese Net (Koch, 2015) | — | — | — | 92.0 |
| MetaNet | 98.45 | 97.32 | 96.4 | 95.92 |

MetaNet outperformed the human performance by a slight margin, but underperformed the probabilistic programming approach. However, the performance gap was rather small between these top three baselines. In addition, while the probabilistic programming performed slightly better than MetaNet, it does not rely on any extra prior knowledge about how characters and strokes were composed. Comparing the results on two Omniglot splits in Tables 1 and 3, MetaNet showed decreasing performances on the standard split. The later setup seemed to be slightly difficult as the number of classes in the training set was less (1200 vs 964) and test classes was bigger (423 vs 659).

MNIST AS Out-of-Domain Data

MNIST images were treated as a separate domain data. Particularly, a model was trained on the Omniglot training set and evaluated on the MNIST test set in a 10-way one-shot learning setup.

Figure 5:
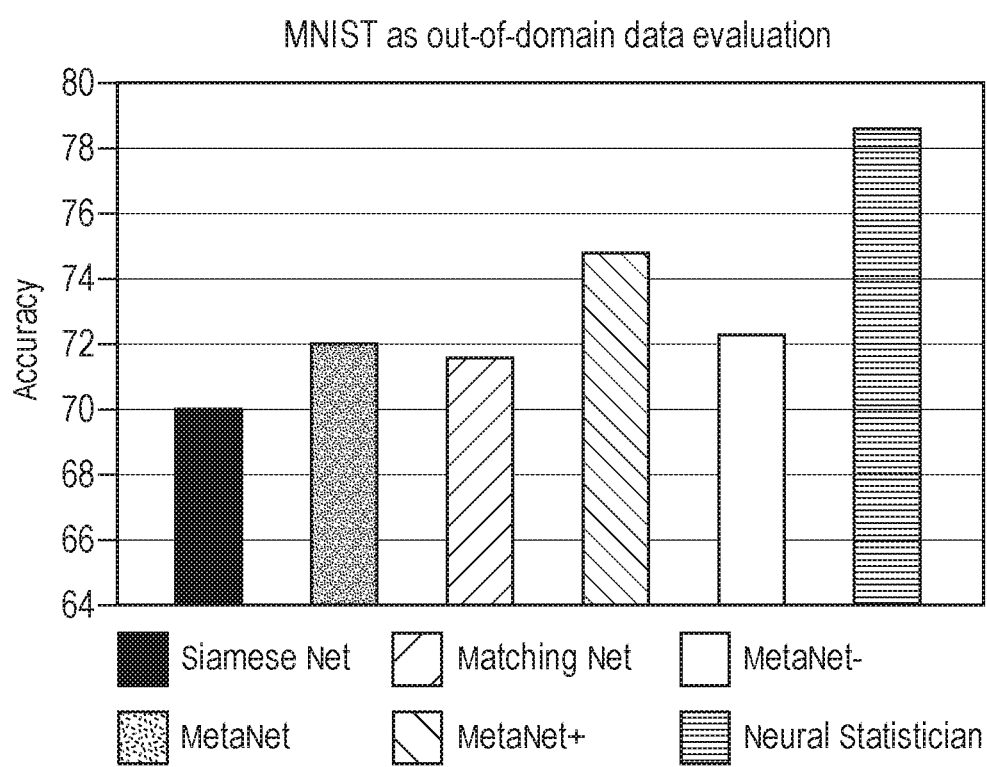
FIG. 5 is a histogram of a MNIST 10-way shot classification employing one embodiment of a method of the invention.

In FIG. 5, the results are plotted. "MetaNet−" achieved 71.6% accuracy which was 0.6% and 3.2% lower than the other variants with fast weights. This was not surprising since MetaNet without dynamic representation learning function lacked an ability to adapt its parameters to MNIST image representations. The standard MetaNet model achieved 74.8% and MetaNet+ obtained 72.3%. Matching Net (Vinyals et al., 2016) reported 72.0% accuracy in this setup. Again, improvement with MetaNet+ model was not observed here. The best result was recently reported by using a generative model, Neural Statistician, that extended variational autoencoder to summarize input set (Edwards & Storkey, 2017).

Generalization Test

We conducted a set of experiments to test the generalization of MetaNet from multiple aspects. The first experiment tests whether a MetaNet model trained on an N-way oneshot task could generalize to another K-way task (where N≠K) without actually training on the second task. The second experiment is to test if a meta learner trained for rapid parameterization of a base learner $b_{train}$ could parameterize another base learner $b_{eval}$ during evaluation. The last experimental setup examines whether MetaNet supports meta-level continual learning.

N-Way Training and K-Way Testing

In this experiment, MetaNet was trained on N-way one-shot classification task and then tested on K-way one-shot tasks. The number of training and test classes were varied (i.e. N ≠ K). To handle this, a softmax layer was inserted into the base learner during evaluation and then augmented with the fast weights generated by the meta learner. If the meta learner was sufficiently generic, it would be able to parameterize the new softmax layer on the fly. The new layer weights remained fixed since no parameter update was performed for this layer. The K-way test tasks were formed from the 423 unseen classes in the test set.

The MetaNet models were trained on one of 5, 10, 15 and 20-way one-shot tasks and evaluated on the rest. Table 4 summarizes the results.

TABLE 4

Accuracy of MetaNet trained on N-way and tested on K-way one-shot tasks

| Train | Test | | | |
|---|---|---|---|---|
| | 5-way | 10-way | 15-way | 20-way |
| 5-way | 98.95 | 96.4 | 93.6 | 93.07 |
| 10-way | 99.25 | 96.87 | 96.95 | 96.21 |
| 15-way | 99.35 | 98.17 | 97.11 | 96.36 |
| 20-way | 99.55 | 98.87 | 97.41 | 97.0 |

As a comparison, we also included some results from Table 1 were also included, which reported accuracy of N-way train and test setting. The MetaNet model trained on 5-way tasks obtained 93.07% of 20-way test accuracy which is still a closer match to Matching Network and higher than Siamese Net trained 20-way tasks. When N was smaller than K, i.e. the model was trained on easier tasks than test ones, a decreasing performance was observed. Conversely, the models trained on harder tasks (i.e. N>K) achieved increasing performances when tested on the easier tasks, and the performance was even higher than the ones that were applied to the tasks with the same level difficulty (i.e. N=K). For example, the model skilled on 20-way classification improved the 5-way one-shot baseline by 0.6% showing a ceiling performance in this setting. A preliminary experiment on more extreme test-time classification was also conducted. MetaNet trained on 10-way task achieved around 65% on 100-way one-shot classification task.

This flexibility in MetaNet was crucial because one-shot learning usually involved an online concept identification scenario. Furthermore, a performance lower or upper bound was empirically obtained. Particularly the test performance obtained on the tasks with the same level difficulty that the model was skilled on could be used as a performance lower or an upper bound depending on a scenario under which the model would be deployed. For example, for the MetaNet model deployed under the N>K scenario, the performance lower bound by testing on the N=K tasks could be obtained.

Rapid Parameterization of Fixed Weight Base Learner

The entire base learner was replaced with a new CNN during evaluation. The slow weights of this network remained fixed. The fast weights were generated by the meta learner, that was trained to parameterize the old base learner, and used to augment the fixed slow weights.

Figure 3:
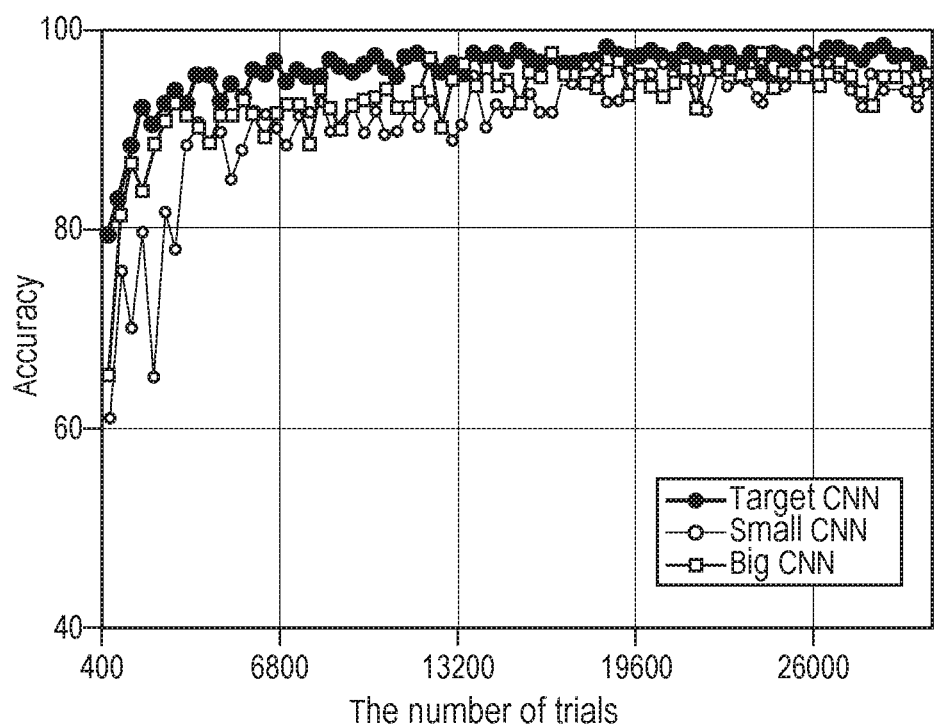
FIG. 3 is a plot of a comparison of test performances of a base learner employed by a method of the invention on an Omniglot 5-way classification.

A small and a large CNN were tested for the base learner. The small CNN had 32 filters and the large CNN had 128 filters. In FIG. 3, the test performances of these CNNs were compared. The base learner (target CNN) optimized along within the model performed better than the fixed weight CNNs. The performance difference between these models was large in earlier training iterations. However, as the meta learner saw more one-shot learning trials, the test accuracies of the base learners converged. This result showed that MetaNet effectively learned to parameterize a neural net with fixed weights.

Meta-Level Continual Learning

MetaNet operated in two spaces: input problem space and meta (gradient) space. If the meta space was problem independent, MetaNet supported meta-level continual learning or life-long learning, as was demonstrated, in the case of the loss gradient.

Following the previous work on catastrophic forgetting in neural networks (Srivastava et al., 2013; Goodfellow et al., 2014; Kirkpatrick et al., 2016), two problems were formatted in a sequential manner. The model was trained and tested on the Omniglot sets and then switched and continued training on the MNIST data. After training on a number of MNIST one-shot tasks, the model was re-evaluated on the same Omniglot test set and performance was compared. A decrease in performance indicated that the meta weights Z and G of the neural nets m and d were prone to catastrophic forgetting and the model therefore did not support continual learning. On the other hand, an increased in performance indicated that MetaNet supported reverse transfer learning and continual learning.

Separate parameters were allocated for the weights W and Q when the problems were switched so only the meta weights were updated. Two three-layer MLPs with 64 hidden units were used as the embedding function and the base learner. The MNIST image and classes were augmented by randomly permuting the pixels. 50 different random shuffles were created and thus the training set for the second one-shot problem consisted of 500 classes. Multiple runs were conducted and the MNIST training trials were increased by multiples of 400 (i.e. 400, 800, 1200 . . . ) in each run giving more time for MetaNet to adapt its meta weights on the second problem so that it could forget the knowledge about Omniglot. Each run was repeated five times and the average statistics were reported. For every run, the network and the optimizer were reinitialized and the training started from scratch.

Figure 4:
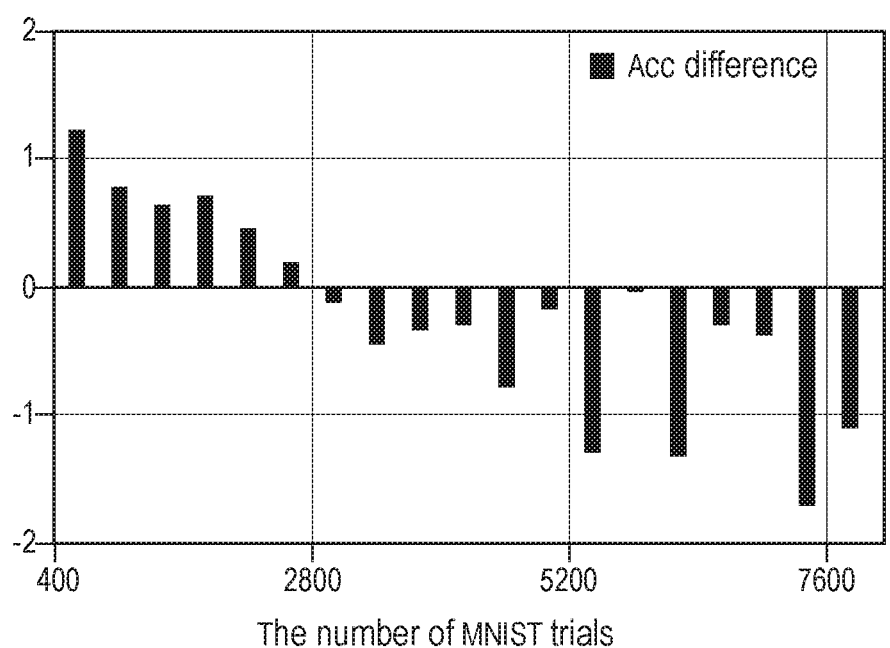
FIG. 4 is a histogram showing the difference between two Omniglot test accuracies obtained before and after training on a MNIST task according to one embodiment of a method of the invention.

In FIG. 4, the accuracy difference between two Omniglot test performances obtained before and after training on the MNIST task were plotted. The performance improvement (y-axis) after training on the MNIST tasks ranged from −1.7% to 1.24% depending on the training time (x-axis). The positive values indicated that the training on the second problem automatically improved the performance of the earlier task exhibiting the reverse transfer property. Therefore, MetaNet successfully performed reverse transfer. At the same time, it was skilled on MNIST one-shot classification. The MNIST training accuracy reached over 72% after 2400 MNIST trials. However, reverse transfer happened only up to a certain point in MNIST training (2400 trials). After that, the meta weights started to forget the Omniglot information. As a result, from 2800 trials onwards, the Omniglot test accuracy dropped. Nevertheless, even after 7600 MNIST trials, at which point the MNIST training accuracy reached over 90%, the Omniglot performance drop was only 1.7%.

Figure 6:
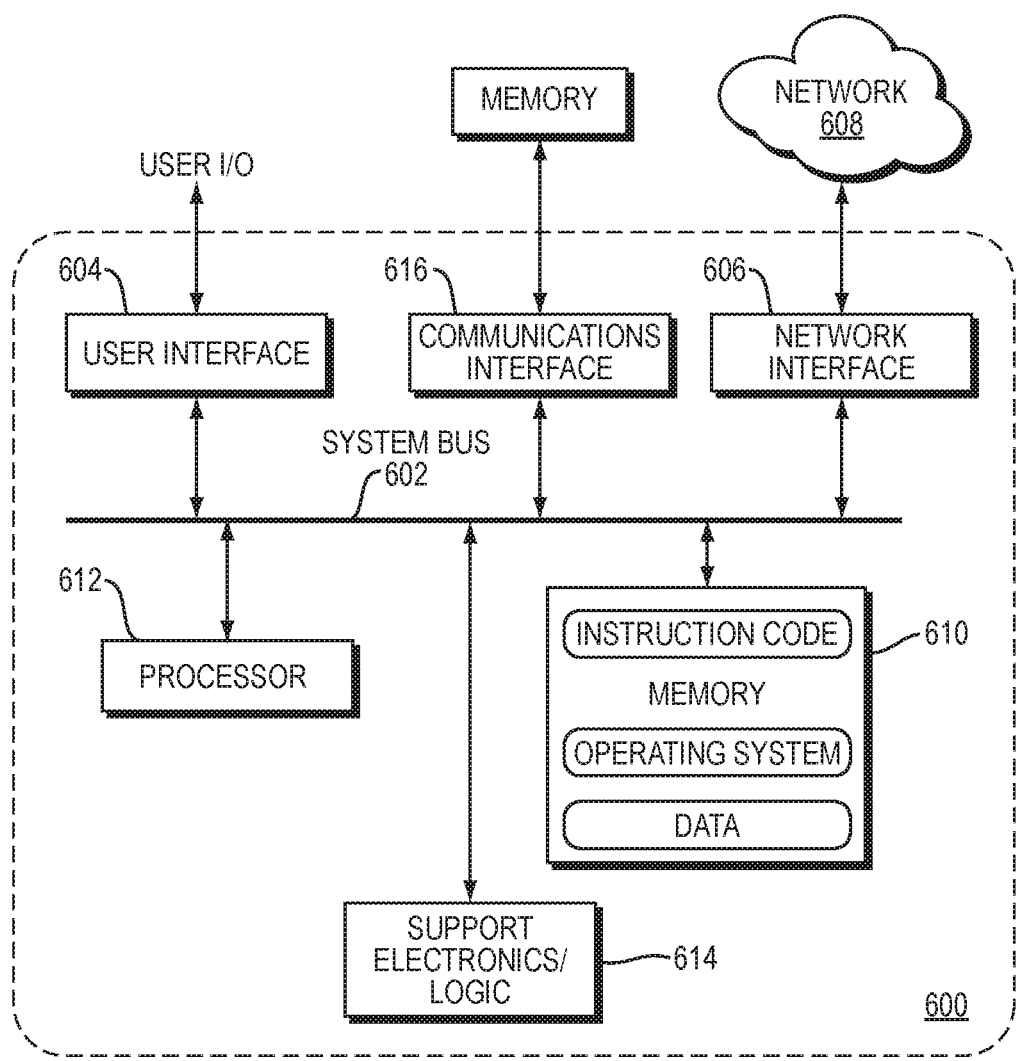
FIG. 6 is a diagram of an example internal structure of a processing system that may be used to implement one or more of the embodiments herein The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 6 is a diagram of an example internal structure of a processing system 600 that may be used to implement one or more of the embodiments herein. Each processing system 600 contains a system bus 602, where a bus is a set of hardware lines used for data transfer among the components of a computer or processing system. The system bus 602 is essentially a shared conduit that connects different components of a processing system (e.g., processor, disk storage, memory, input/output ports, network ports, etc.) that enables the transfer of information between the components.

Attached to the system bus 602 is a user I/O device interface 604 for connecting various input and output devices (e.g., keyboard, mouse, displays, printers, speakers, etc.) to the processing system 600. A network interface 606 allows the computer to connect to various other devices attached to a network 608. Memory 610 provides volatile and non-volatile storage for information such as computer software instructions used to implement one or more of the embodiments of the present invention described herein, for data generated internally and for data received from sources external to the processing system 600.

A central processor unit 612 is also attached to the system bus 602 and provides for the execution of computer instructions stored in memory 610. The system may also include support electronics/logic 614, and a communications interface 616. The communications interface may comprise the interface to the weight memory described with reference to FIG. 1.

In one embodiment, the information stored in memory 610 may comprise a computer program product, such that the memory 610 may comprise a non-transitory computer-readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the software instructions may also be downloaded over a cable communication and/or wireless connection. In some embodiments, the weight memory described with reference to FIG. 1 may be embedded in the memory 610, or it may be implemented as a separate memory device.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

Discussion

One-shot learning in combination with a meta learning framework was demonstrated to be a useful approach to address certain neural network drawbacks related to rapid generalization with small data and continual learning. The method of the invention is meta learning method, termed "MetaNet" herein, that performs a generic knowledge acquisition in a meta space and shifts the parameters and inductive biases of underlying neural networks via fast parameterization for the rapid generalization.

Under the MetaNet framework, an important consideration was the type of higher order meta information that could be extracted as a feedback from the model when operating on a new task. One desirable property here was that the meta information should be generic and problem independent. It should also be expressive enough to explain the model setting in the current task space. We explored the use of loss gradients as meta information in this work. As shown in the results, using the gradients as meta information was demonstrated. MetaNet obtained results on several one-shot SL benchmarks and led to a very flexible AI model. For instance, in MetaNet, different softmax layers could be alternated on the fly during test. It supported continual learning. Neural nets were observed with fixed slow weights that could perform well for new task inputs when augmented with the fast weights. When the slow weights were updated during training, it learned domain biases resulting in even better performance on identification of new concepts within the same domain.

A method of the invention was, therefore, demonstrated to be an effective alternative to known direct optimization methods.

REFERENCES

Andrychowicz, Marcin, Denil, Misha, Gomez, Sergio, Hoffman, Matthew W, Pfau, David, Schaul, Tom, and de Freitas, Nando. Learning to learn by gradient descent by gradient descent. In *Advances in Neural Information Processing Systems*, pp. 3981-3989, 2016.

Ba, Jimmy, Hinton, Geoffrey E, Mnih, Volodymyr, Leibo, Joel Z, and Ionescu, Catalin. Using fast weights to attend to the recent past. In *Advances In Neural Information Processing Systems*, pp. 4331-4339, 2016.

Bengio, Yoshua, Bengio, Samy, and Cloutier, Jocelyn. *Learning a synaptic learning rule*. Université de Montréal, Département d'informatique et de recherche opérationnelle, 1990.

Chopra, Sumit, Hadsell, Raia, and LeCun, Yann. Learning a similarity metric discriminatively, with application to face verification. In Computer Vision and Pattern Recognition, 2005. CVPR 2005. *IEEE Computer Society Conference on*, volume 1, pp. 539-546. IEEE, 2005.

David Ha, Andrew Dai and Le, Quoc V. Hypernetworks. In ICLR 2017, 2017. De Brabandere, Bert, Jia, Xu, Tuytelaars, Tinne, and Van Gool, Luc. Dynamic filter networks. In Neural Information Processing Systems (NIPS), 2016. Edwards, Harrison and Storkey, Amos. Towards a neural statistician. In ICLR 2017, 2017.

Gomez, Faustino and Schmidhuber, Jürgen. Evolving modular fast-weight networks for control. In *International Conference on Artificial Neural Networks*, pp. 383-389.Springer, 2005.

Goodfellow, Ian J, Mirza, Mehdi, Xiao, Da, Courville, Aaron, and Bengio, Yoshua. An empirical investigation of catastrophic forgetting in gradient-based neural networks. In ICLR 2014, 2014.

Graves, Alex, Wayne, Greg, and Danihelka, Ivo. Neural turing machines. *arXiv preprint arXiv:*1410.5401, 2014.

Greengard, Paul. The neurobiology of slow synaptic transmission. *Science,* 294(5544):1024-1030, 2001.

Harlow, Harry F. The formation of learning sets. *Psychological review,* 56(1):51, 1949.

Hinton, Geoffrey E and Plaut, David C. Using fast weights to deblur old memories. In *Proceedings of the ninth annual conference of the Cognitive Science Society*, pp. 177-186, 1987.

Hochreiter, Sepp, Younger, A Steven, and Conwell, Peter R. Learning to learn using gradient descent. In *International Conference on Artificial Neural Networks*, pp. 87-94. Springer, 2001.

Kaiser, Lukasz, Nachum, Ofir, Roy, Aurko, and Bengio, Samy. Learning to remember rare events. In *ICLR* 2017, 2017.

Kirkpatrick, James, Pascanu, Razvan, Rabinowitz, Neil, Veness, Joel, Desjardins, Guillaume, Rusu, Andrei A, Milan, Kieran, Quan, John, Ramalho, Tiago, Grabska-Barwinska, Agnieszka, et al. Overcoming catastrophic forgetting in neural networks. *arXiv preprintarXiv:*1612.00796, 2016.

Koch, Gregory. *Siamese neural networks for one-shot image recognition*. PhD thesis, University of Toronto, 2015.

Lake, Brenden M, Salakhutdinov, Ruslan R, and Tenenbaum, Josh. One-shot learning by inverting a compositional causal process. In *Advances in neural information processing systems*, pp. 2526-2534, 2013.

Lake, Brenden M, Salakhutdinov, Ruslan, and Tenenbaum, Joshua B. Human-level concept learning through probabilistic program induction. *Science,* 350(6266):1332-1338, 2015.

Li, Ke and Malik, Jitendra. Learning to optimize. In *ICLR* 2017, 2017.

Maclaurin, Dougal, Duvenaud, David, and Adams, Ryan. Gradient-based hyperparameter optimization through reversible learning. In *International Conference on Machine Learning*, pp. 2113-2122, 2015.

Mitchell, Tom M, Thrun, Sebastian B, et al. Explanation based neural network learning for robot control. *Advances in neural information processing systems*, pp. 287-287, 1993.

Munkhdalai, Tsendsuren and Yu, Hong. Neural semantic encoders. In *Proceedings of the 15th Conference of the European Chapter of the Association for Computational Linguistics: Volume 1, Long Papers*, pp. 397-407, Valencia, Spain, April 2017. Association for Computational Linguistics. URL http://www.aclweb.org/anthology/E17-1038.

Ravi, Sachin and Larochell, Hugo. Optimization as a model for few-shot learning. In ICLR 2017, 2017.

Santoro, Adam, Bartunov, Sergey, Botvinick, Matthew, Wierstra, Daan, and Lillicrap, Timothy. Meta-learning with memory-augmented neural networks. In *Proceedings of The 33rd International Conference on Machine Learning*, pp. 1842-1850, 2016.

Schmidhuber, J. *Reducing the Ratio Between Learning Complexity and Number of Time Varying Variables in Fully Recurrent Nets*, pp. 460-463. Springer London, London, 1993a. ISBN 978-1-4471-2063-6. doi: 10.1007/978-1-4471-2063-6 110. URL http://dx.doi.org/10.1007/978-1-4471-2063-6_110.

Schmidhuber, J. A neural network that embeds its own meta-levels. In *IEEE International Conference on Neural Networks*, pp. 407-412 vol. 1, 1993b. doi: 10.1109/ICNN.1993.298591.

Schmidhuber, Jürgen. *Evolutionary principles in self-referential learning*. PhD thesis, Technical University of Munich, 1987.

Schmidhuber, Jürgen. Learning to control fast-weight memories: An alternative to dynamic recurrent networks. *Neural Computation,* 4(1):131-139, 1992.

Srivastava, Rupesh K, Masci, Jonathan, Kazerounian, Sohrob, Gomez, Faustino, and Shmidhuber, Jürgen. Compete to compute. In *Advances in neural information processing systems*, pp. 2310-2318, 2013.

Sukhbaatar, Sainbayar, Weston, Jason, Fergus, Rob, et al. End-to-end memory networks. In *Advances in neural information processing systems*, pp. 2440-2448, 2015.

Vilalta, Ricardo and Drissi, Youssef. A perspective view and survey of meta-learning. *Artificial Intelligence Review,* 18(2):77-95, 2002.

Vinyals, Oriol, Blundell, Charles, Lillicrap, Tim, Wierstra, Daan, et al. Matching networks for one shot learning. In *Advances in Neural Information Processing Systems*, pp. 3630-3638, 2016.

Weston, Jason, Chopra, Sumit, and Bordes, Antoine. Memory networks. In *In Proceedings Of The International Conference on Representation Learning* (ICLR 2015), San Diego, Calif., May 2015.

Younger, A Steven, Conwell, Peter R, and Cotter, Neil E. Fixed-weight on-line learning. *IEEE Transactions on Neural Networks*, 10(2):272-283, 1999

The relevant teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method of classifying an input task data set by meta level continual learning, by a processor and an instruction memory with computer code instructions stored thereon, the instruction memory operatively coupled to the processor such that, when executed by the processor, the computer code instructions cause a system to implement the method, the method comprising:
   a) analyzing a first training data set to thereby generate a first meta information value in a task space;
   b) assigning the first meta information value to the first training data set to generate a first meta weight value in a meta space;
   c) analyzing a second training data set that is distinct from the first training data set to generate a second meta information value in the task space;
   d) assigning the second meta information value to the second training data set to generate a second meta weight value in the meta space;
   e) comparing the first meta weight value and the second meta weight value to generate a slow weight value;
   f) storing the slow weight value in a weight memory that is accessible by the task space and the meta space;
   g) comparing the input task data set to the slow weight value to generate a third meta information value in the task space;
   h) transmitting the third meta information value from the task space to the meta space;
   i) comparing the third meta information value to the slow weight value to generate a fast weight value in the meta space;
   j) storing the fast weight in the weight memory; and
   k) parameterizing the first and second meta weight values with the fast weight value to update the slow weight value, whereby a value is associated with the input task data set, thereby classifying the input task data set by meta level continual learning.

2. The method of claim 1, wherein parameterizing the first and second meta weight values is by multilayer perception parameterization.

3. The method of claim 2, wherein the multilayer perception parameterization is layer augmented multilayer perception parameterization.

4. A method of facilitating one-shot learning in a neural network, by a processor and an instruction memory with computer code instructions stored thereon, the instruction memory operatively coupled to the processor such that, when executed by the processor, the computer code instructions cause a system to implement the method, the method comprising:
   a) for each of a set of T support examples from a set of N support examples, N and T being integers,
      i) generating a representation loss associated with using a representation learning function parameterized by a first slow weight (Q), and
      ii) generating a representation loss gradient based on the representation loss and a loss gradient associated with the first slow weight (Q);
   b) generating a first fast weight by evaluating a first generating function parameterized by a first meta weight (G) and the loss gradient associated with the first slow weight generated for the T support examples;
   c) for each of the set of N support examples,
      i) generating a task loss using a base learning function parameterized by a second slow weight (W),
      ii) generating a task loss gradient based on the task loss and a loss gradient associated with the second slow weight (W),
      iii) mapping the task loss gradient, through a second generating function parameterized by a second meta weight (Z), to a second fast weight, and storing the second fast weight in a weight memory, and
      iv) generating a first task-dependent input representation using the representation learning function parameterized by an integration of the first slow weight and the first fast weight, and indexing the weight memory with the first task-dependent input representation;
   d) for each of a set of L training examples, L being an integer,
      i) generating a second task-dependent input representation using the representation learning function parameterized by the integration of the first slow weight and the first fast weight,
      ii) reading the weight memory with soft attention, using the second task-dependent input representation, to generate a third fast weight, and
      iii) generating a training loss using a base learning function parameterized by an integration of the second slow weight and the second fast weight, added to a previous training loss; and
   e) updating the first slow weight, the second slow weight, the first meta weight and the second meta weight using the training loss and a loss gradient associated with the first slow weight, the second slow weight, the first meta weight and the second meta weight.

5. The method of claim 4, wherein each of (i) the integration of the first slow weight and the first fast weight, and (ii) the integration of the second slow weight and the second fast weight, is performed using an augmentation layer approach, wherein an input of an augmentation layer is first transformed by the slow and fast weights, then passed through a non-linearity resulting in separate activation vectors, then the activation vectors are aggregated by an element-wise vector addition.

6. The method of claim 5, wherein the non-linearity is implemented with a rectified linear unit (ReLU).

7. The method of claim 4, wherein the set of N support examples comprise class labels.

8. The method of claim 4, wherein the representation learning function is a neural network.

9. The method of claim 4, wherein generating the task loss further comprises utilizing a loss function capable of capturing a representation learning objective.

10. The method of claim 9, wherein the loss function is a cross-entropy loss function when the set of N support examples has a single example per class.

11. The method of claim 9, wherein the loss function is a contrastive loss function when the set of N support examples has a more than one example per class.

12. The method of claim 4, wherein reading the weight memory with soft attention comprises an attention function and a normalizing function.

13. A non-transitory computer-readable medium with computer code instructions stored thereon, the computer code instructions, when executed by a processor, cause an apparatus to:
  a) for each of a set of T support examples from a set of N support examples, N and T being integers,
    i) generate a representation loss associated with using a representation learning function parameterized by a first slow weight (Q), and
    ii) generate a representation loss gradient based on the representation loss and a loss gradient associated with the first slow weight (Q);
  b) generate a first fast weight by evaluating a first generating function parameterized by a first meta weight (G) and the loss gradient associated with the first slow weight generated for the T support examples;
  c) for each of the set of N support examples,
    i) generate a task loss using a base learning function parameterized by a second slow weight (W),
    ii) generate a task loss gradient based on the task loss and a loss gradient associated with the second slow weight (W),
    iii) map the task loss gradient, through a second generating function parameterized by a second meta weight (Z), to a second fast weight, and storing the second fast weight in a weight memory, and
    iv) generate a first task-dependent input representation using the representation learning function parameterized by an integration of the first slow weight and the first fast weight, and indexing the weight memory with the first task-dependent input representation;
  d) for each of a set of L training examples, L being an integer,
    i) generate a second task-dependent input representation using the representation learning function parameterized by the integration of the first slow weight and the first fast weight,
    ii) read the weight memory with soft attention, using the second task-dependent input representation, to generate a third fast weight, and
    iii) generate a training loss using a base learning function parameterized by an integration of the second slow weight and the second fast weight, added to a previous training loss; and
  e) update the first slow weight, the second slow weight, the first meta weight and the second meta weight using the training loss and a loss gradient associated with the first slow weight, the second slow weight, the first meta weight and the second meta weight.

14. The non-transitory computer-readable medium of claim 13, wherein the computer code instructions, when executed by the processor, further cause the apparatus to (i) integrate the first slow weight and the first fast weight, and (ii) integrate the second slow weight and the second fast weight, using an augmentation layer approach, wherein an input of an augmentation layer is first transformed by the slow and fast weights, then passed through a non-linearity resulting in separate activation vectors, then the activation vectors are aggregated by an element-wise vector addition.

15. A system for facilitating one-shot learning in neural network, comprising:
  a) a meta learner;
  b) a base learner operatively coupled to the meta learner, the meta learner and base learner implemented by a processor and an instruction memory with computer code instructions stored thereon, the instruction memory operatively coupled to the processor such that, when executed by the processor, the computer code instructions cause the system to cooperatively (i) acquire meta information from a support set of examples, (ii) generate one or more fast weights, and (iii) optimize one or more slow weights used by the base learner, based on the one or more fast weights and a training set of examples, the meta learner and base learner are configured to cooperatively integrate a first slow weight and a first fast weight using an augmentation layer approach, wherein an input of an augmentation layer is first transformed by the slow and fast weights, then passed through a non-linearity resulting in separate activation vectors, then the activation vectors are aggregated by an element-wise vector addition; and
  c) a weight memory device operatively coupled to the meta learner and the base learner, the meta learner and base learner being configured to cooperatively store the one or more slow weights and the one or more fast weights in the weight memory device.

16. The system of claim 15, wherein the non-linearity is implemented with a rectified linear unit (ReLU).

17. The system of claim 15, wherein the support set of examples and the training set of examples further comprise class labels.

18. The system of claim 15, wherein the meta learner and base learner are configured to evaluate each example instance from the support set of examples and the training set of examples, and generate the one or more fast weights and optimize the one or more slow weights based on the example instance, before an evaluation of a subsequent example instance.

19. The system of claim 15, wherein the meta learner and base learner are integrated by a layer augmented multilayer perceptron (MLP).

* * * * *